No. 879,959. PATENTED FEB. 25, 1908.
C. HALLIDAY.
MEANS FOR SUPPORTING CLIMBING PLANTS.
APPLICATION FILED JULY 9, 1906.
2 SHEETS—SHEET 1.
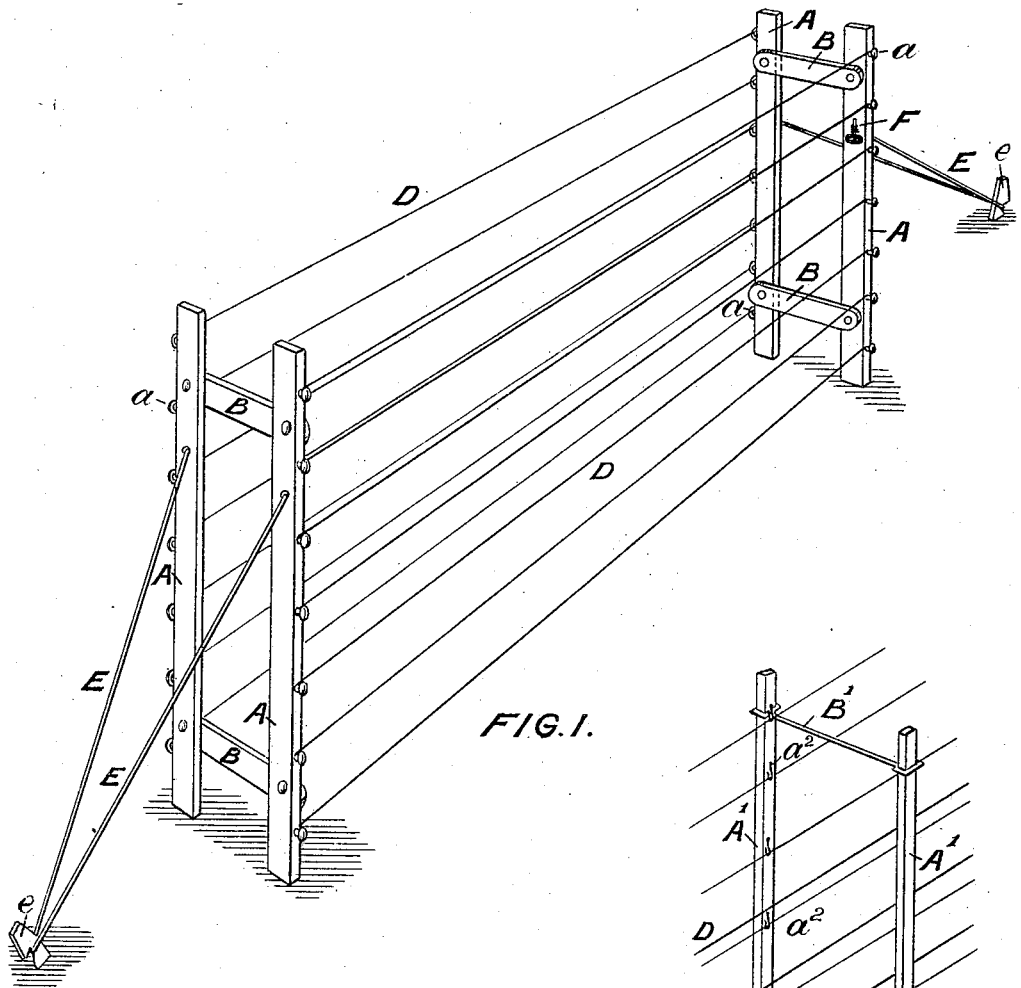
FIG. 1.
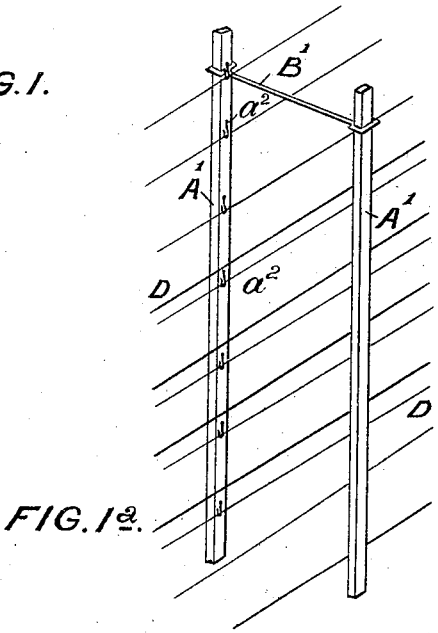
FIG. 1ª.
WITNESSES.
Joseph Bates.
S. G. James.
INVENTOR.
Charles Halliday No. 879,959. PATENTED FEB. 25, 1908.
C. HALLIDAY.
MEANS FOR SUPPORTING CLIMBING PLANTS.
APPLICATION FILED JULY 9, 1906.

2 SHEETS—SHEET 2

WITNESSES.
Joseph Bates.
S. G. James.

INVENTOR.
Charles Halliday

UNITED STATES PATENT OFFICE.

CHARLES HALLIDAY, OF BANBRIDGE, IRELAND.

MEANS FOR SUPPORTING CLIMBING PLANTS.

No. 879,959.　　　Specification of Letters Patent.　　　Patented Feb. 25, 1908.

Application filed July 9, 1906. Serial No. 325,376.

*To all whom it may concern:*

Be it known that I, CHARLES HALLIDAY, British subject, and resident of Banbridge, county Down, Ireland, have invented certain new and useful Improvements in Means for Supporting Climbing Plants, of which the following is a specification.

This invention relates to a garden appliance for training or supporting, while growing, peas or other climbing plants.

It consists essentially of a frame or frames constructed with upright standards connected by two or more cross bars with loose or articulate joints so as to allow an independent movement to each upright standard of the frame thereby making it easy to fix in or remove from the ground, two or more of such frames when fixed being further connected by wires or cords attached thereto.

The invention will be fully described with reference to the accompanying drawings:—

Figures 2, 3:
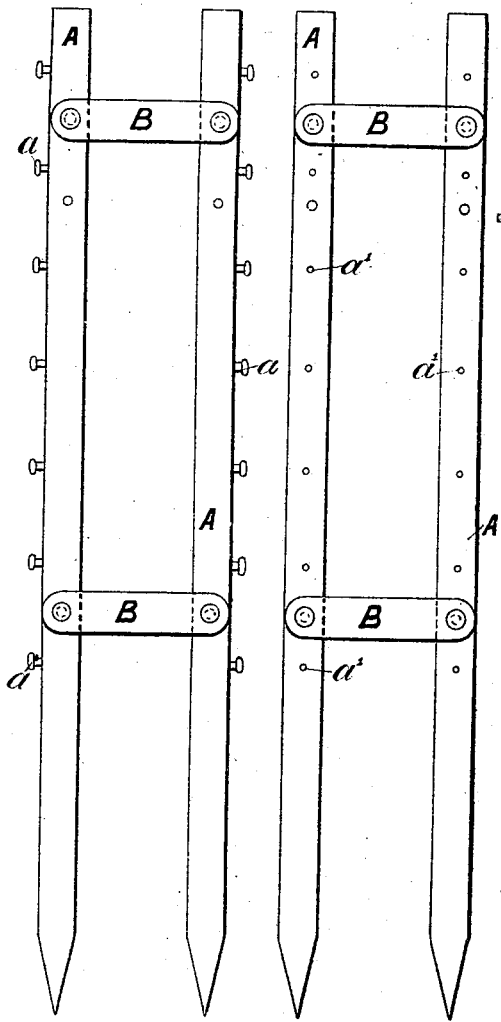
Figures 4, 5:
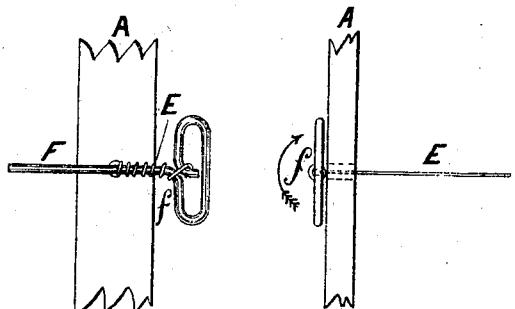
Figure 6:
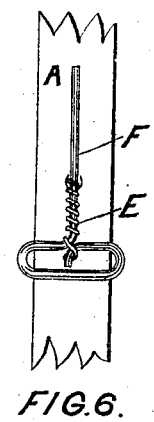

Figure 1. perspective view of the pea trainer erected for use. Fig. 1$^a$. perspective view of an intermediate frame. Fig. 2. end elevation of single frame with pins or studs for securing the wires. Fig. 3. end elevation of frame with holes to pass the wires through. Figs. 4, 5 and 6. detail views showing method of stretching and securing the wires.

Each frame is made of the two upright standards A joined or connected together by the cross bars B. These cross bars are so attached by swiveling or articulate joints as to allow an independent parallel movement to each upright standard A. This construction permits the uprights to be driven into the ground independently one a little in advance of the other at the same time maintaining them vertical, making it easy to fix or erect the standards and to remove them again from the ground.

The uprights A may be made of metal or wood of any suitable shape in cross section, such as flat, square angle tee channel round or other shape but for iron uprights I at present prefer to make them of flat or angle section.

The uprights are provided at intervals at suitable distances apart with studs or pins $a$ or with holes $a'$ or other device to which to affix training wires or cords D. The training wires or cords D are stretched between and supported by two or more of the frames forming with or without the intermediate standards A' the complete plant trainer or supporting appliance.

The frames and upright standards A are stayed or supported in a suitable way such as by stay cords or wires E attached to the back and engaging with pegs or stakes $e$ driven into the ground a short distance behind them. The wire E may be easily secured in position on the standard A and tightened up as required by a key or bar F with a bow $f$ or flat head to which the wire after passing through a hole in the standard is attached. By winding or coiling the wire E upon the key or bar F it is tightened to any desired extent as shown in Figs. 4 and 5 (enlarged scale.) When the wire is stretched to the desired extent the key is turned to the position shown in Fig. 6, with the bow against the standard which prevents the unwinding of the wire, or the stay wires may be tightened and secured by an ordinary screw eye or hook and nut etcetera.

Intermediate standards or supports A' may be erected between the end standards and frames; these may be either connected together as the end standards are, or loose from and independent of one another until erected, and then connected by a loose or removable cross bar, B'. Upon these uprights, hooks $a^2$ are fixed or other suitable arrangement made for supporting the training wires but in such a manner that the wire can run loosely through same and so can be tightened from the end or pulled through without disturbing the upright.

In operation the end frames or standards A are first erected, the stay wires E are then placed in position and connected to the pegs or stakes $e$ and the stay wires then tightened by the key F or other device until the standards are in an upright position and held firmly to resist the pull or strain of the training wires which are next fastened to the studs or other arrangement and stretched loosely between the two end frames. The intermediate standards B' (when used) are then placed in position and the training wires passed through the hooks $a^2$ or other device and finally the wires are all tightened up and made fast in position. Instead of the studs $a$ the wires D may be passed through the holes $a'$ in the standards and each wire stretched separately by a key such as F, or other device.

The framework will last for years, the wire only requiring addition or renewal yearly, at a very small outlay.

With using the intermediate supports at intervals of about six feet apart, one set of end frames is sufficient for a row of 30 feet, or even longer, and can be adjusted to suit any shorter length.

It is an ornament in the garden, keeping the growing peas in neat straight lines, and does not come in the way when gathering the ripe pods.

What I claim as my invention and desire to protect by Letters Patent is:—

1. A trainer or support for peas or other plants constructed with two end frames each frame comprising two uprights connected loosely together by cross bars pivoted thereto and provided with devices to which to attach wires or cords, intermediate frames furnished with hooks to assist in holding up the wires between the two end frames, and wires or cords stretched from frame to frame substantially as described.

2. In a trainer or support for peas or other plants the combination of two uprights A provided with pointed ends to enter the ground, devices thereon to which to attach cords or wires cross bars B loosely affixed thereto to permit of an independent movement to each standard when being forced into and withdrawn from the ground, wires or cords D affixed to the standards and stretched between them and stays E to maintain the standards upright.

3. In a trainer or support for peas or other plants the combination of two uprights A provided with pointed ends to enter the ground, devices thereon to which to attach cords or wires cross bars B loosely affixed thereto to permit of an independent movement to each standard when being forced into and withdrawn from the ground, wires or cords D affixed to the standards and stretched between them and stays E to maintain the standards upright and straining keys F to tighten the stays E, substantially as described.

In witness whereof, I have hereunto signed my name in the presence of two subscribing witnesses.

CHARLES HALLIDAY.

Witnesses:
EDWARD HARVEY,
JOSEPH MCGUINNESS.